(12) United States Patent
Morrison et al.

(10) Patent No.: US 9,487,250 B2
(45) Date of Patent: Nov. 8, 2016

(54) VEHICLE COMPRISING AT LEAST ONE APPARATUS FOR REDUCING DRAG ON THE VEHICLE

(71) Applicant: IMPERIAL INNOVATIONS LIMITED, London (GB)

(72) Inventors: Jonathan Finlay Morrison, London (GB); Anthony Oxlade, Berkshire (GB); Ala Makram Qubain, Amman (JO); Juan Marcos Garcia de la Cruz Lopez, Alicante (ES)

(73) Assignee: Imperial Innovations Limited (GB)

( * ) Notice: Subject to any disclaimer, the term of this patent is extended or adjusted under 35 U.S.C. 154(b) by 0 days.

(21) Appl. No.: 14/417,684

(22) PCT Filed: Jul. 26, 2013

(86) PCT No.: PCT/GB2013/052019
§ 371 (c)(1),
(2) Date: Jan. 27, 2015

(87) PCT Pub. No.: WO2014/016618
PCT Pub. Date: Jan. 30, 2014

(65) Prior Publication Data
US 2015/0210323 A1    Jul. 30, 2015

(30) Foreign Application Priority Data

Jul. 27, 2012 (GB) .................................. 1213451.6
Jan. 25, 2013 (GB) .................................. 1301323.0

(51) Int. Cl.
*B62D 35/00* (2006.01)
*F15D 1/00* (2006.01)

(52) U.S. Cl.
CPC ............. *B62D 35/001* (2013.01); *B62D 35/00* (2013.01); *F15D 1/00* (2013.01); *F15D 1/008* (2013.01)

(58) Field of Classification Search
CPC ....... B62D 35/001; B62D 35/00; F15D 1/00; F15D 1/008
See application file for complete search history.

(56) References Cited

FOREIGN PATENT DOCUMENTS

| DE | 102008060257 A1 | 6/2010 |
| EP | 1544089 A1 | 6/2005 |
| EP | 1873044 A1 | 1/2008 |

(Continued)

OTHER PUBLICATIONS

Great Britain Search Report, GB Application No. 1301323.0, 4 pages, Jun. 19, 2013.

(Continued)

*Primary Examiner* — Lori L Lyjak
(74) *Attorney, Agent, or Firm* — Dorsey & Whitney LLP

(57) ABSTRACT

A vehicle comprising at least one pressure-drag-reducing apparatus (1) for reducing the pressure drag on the vehicle. The apparatus comprises: a housing (31) at least partly defining a cavity (34) and an aperture (35) in the housing (31), the cavity (34) in fluid communication via the aperture (35) with the environment surrounding the vehicle; and oscillating means (32, 36) for creating an oscillation in pressure across the aperture between the cavity and the environment. The cavity volume, the frequency of oscillation, the aperture size and the amplitude of oscillation are arranged to cause fluid to be alternately drawn into, and ejected from, the cavity through the aperture. The apparatus is positioned relative to the remainder of the vehicle such that the ejected fluid entrains fluid from the environment to reduce pressure drag on the vehicle.

25 Claims, 11 Drawing Sheets

(56) References Cited

FOREIGN PATENT DOCUMENTS

| EP | 2607214 | A1 | 6/2013 |
| FR | 2896757 | A3 | 8/2007 |
| FR | 2931440 | A1 | 11/2009 |
| KR | 20080055137 | A | 6/2008 |
| WO | WO2007088310 | A1 | 8/2007 |
| WO | WO2011004124 | A2 | 1/2011 |

OTHER PUBLICATIONS

International Search Report and Written Opinion, PCT/GB2013/052019, 12 pages, Oct. 4, 2013.

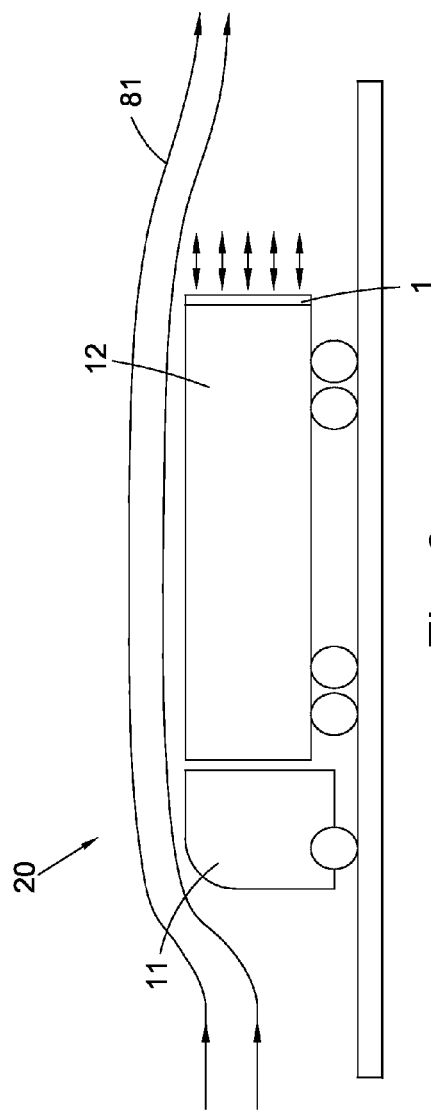
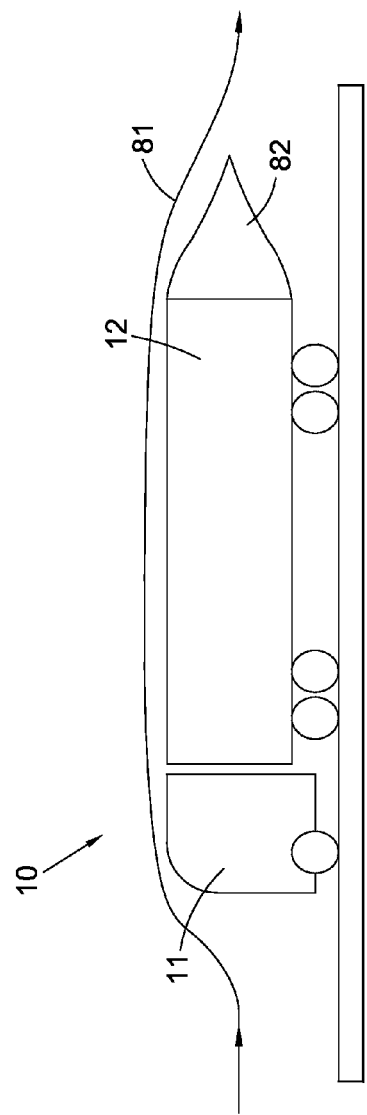

VEHICLE COMPRISING AT LEAST ONE APPARATUS FOR REDUCING DRAG ON THE VEHICLE

CROSS-REFERENCE TO RELATED APPLICATIONS

This application is a national stage application under 35 U.S.C. §371 of International Application No. PCT/GB2013/052019, filed Jul. 26, 2013, entitled "A Vehicle Comprising At Least One Apparatus for Reducing Drag on the Vehicle", which claims priority to GB Application No. 1301323.0, filed on Jan. 25, 2013, and GB Application No. 1213451.6, filed on Jul. 27, 2012, the contents of which are hereby incorporated by reference herein in their entireties for all purposes.

FIELD

This invention relates to a vehicle comprising at least one apparatus for reducing drag on the vehicle. It also relates to the apparatus.

BACKGROUND

The drag experienced by a vehicle moving through air at motorway speeds (or "freeway" speeds, in American English) is the single largest contributor to that vehicle's fuel consumption. If the drag force on a vehicle can be reduced, less fuel will be required to run the vehicle, reducing running costs and environmental damage caused by the burning of fuel.

Drag on a vehicle from the air in which it moves is made up chiefly of two components: friction drag and pressure drag. FIG. 1 shows a large goods vehicle (LGV) 10 in motion. The vehicle comprises a cab 11 and a trailer 12. The cab 11 and trailer 12 together form a bluff body. A bluff body is a body for which the boundary layer separates from much of the surface of the body. It is therefore a feature of bluff bodies that the pressure drag on the body while it is moving through a fluid is a much greater proportion of the total drag than is the frictional drag. Thus the pressure drag on the LGV while it is moving through air accounts for a significant proportion of the total drag; for an articulated lorry (or "truck", in American English), pressure drag can be as much as 90% of the total drag.

The pressure drag on a body is proportional to the pressure at the front of the body moving into the air minus the pressure at the opposite end of the body. The pressure drag on the LGV 10 shown in FIG. 1 is proportional to the pressure at the front of the cab 11 minus the pressure at the back of the trailer 12. There are, therefore, three approaches to reducing the pressure drag on this vehicle: reducing the pressure at the front of the vehicle, increasing the pressure at the back of the vehicle, or a combination of the two.

Attempts have been made to increase the pressure at the back of an LGV by introducing fairings on the vehicle to streamline it. However, when these fairings are arranged at the back of the vehicle, they increase the length of the vehicle and can therefore reduce its manoeuvrability and can also interfere with vehicle loading.

An object of at least certain embodiments is to address one or more of these problems.

SUMMARY

According to a first aspect of the invention, there is provided a vehicle comprising at least one pressure-drag-reducing apparatus for reducing the pressure drag on the vehicle, the apparatus comprising:

a housing at least partly defining a cavity and an aperture in the housing, the cavity in fluid communication via the aperture with the environment surrounding the vehicle; and oscillating means for creating an oscillation in pressure across the aperture between the cavity and the environment;

the cavity volume, the frequency of oscillation, the aperture size and the amplitude of oscillation arranged to cause fluid to be alternately drawn into, and ejected from, the cavity through the aperture, and the apparatus positioned relative to the remainder of the vehicle such that the ejected fluid entrains fluid from the environment to reduce pressure drag on the vehicle.

The pressure drag on a vehicle comprising at least one pressure-drag-reducing apparatus according to this aspect can be decreased without introducing a fairing, and therefore without increasing the length of the vehicle. This may be useful since vehicle lengths are limited by law in some countries and also since shorter vehicles may be more manoeuvrable. The or each pressure-drag-reducing apparatus may be fitted to the or each rear door of the vehicle. The pressure-drag-reducing apparatuses need not, therefore, obstruct the opening of the doors, making the vehicle easier to load.

The oscillating means may be inside the cavity. The oscillating means may at least partly define the cavity. The housing may comprise walls. The oscillating means may form one of the cavity walls. The oscillating means may be set into one of the walls.

The oscillating means may comprise a diaphragm. The diaphragm may be electrically conductive. The diaphragm may be metal. The diaphragm may be steel. The diaphragm may be curved away from its ends and/or edges when it is at rest.

The oscillating means may comprise a piezoelectric material bonded to the diaphragm. The diaphragm may be formed from a piezoelectric material. The apparatus may comprise a driving means arranged to drive the oscillating means. In an embodiment, the driving means is a variable frequency alternating current power supply. The driving means may be arranged to drive the oscillating means by applying an alternating voltage to the piezoelectric material. This arrangement requires only a relatively low supply current to achieve a relatively large displacement of the oscillating means.

The driving means may be arranged to drive the oscillating means by applying force substantially at the centre of the oscillating means. This arrangement requires less force to be applied to the oscillating means to produce a given amplitude of oscillation of the oscillating means than if the oscillating means were to be driven at or closer to its ends or edges. In an embodiment, the driving means comprises a variable frequency ac power supply and a solenoid. The driving means may be arranged to pass an alternating current through a solenoid coil, thereby causing a solenoid core to alternately move in one direction and the opposite direction. The solenoid core may therefore apply force to the oscillating means each time the alternating current travels in one direction through the coil. This arrangement requires a relatively low voltage for a given maximum amplitude of oscillation and can be reliable over many oscillations. The components required for this arrangement (steel sheet, ac power supply and solenoid) are also relatively inexpensive.

In an embodiment, the driving means comprises a pneumatically operated piston. The driving means may be arranged to drive the oscillating means sinusoidally. The driving means may be arranged to drive the oscillating means at a frequency substantially equal to the resonance frequency of the oscillating means. In operation, the resonance frequency of the cavity may be substantially equal to the resonance frequency of the oscillating means. The driving means may therefore be arranged to drive the oscillating means at a frequency substantially equal to the resonance frequency of both the cavity and the oscillating means, which is the resonance frequency of the apparatus. In this arrangement, the maximum amplitude of oscillation of the fluid for a given input power can be achieved.

The driving means may be arranged to drive the oscillating means at varying amplitudes. The driving means may be arranged to drive the oscillating means using amplitude modulation. In this embodiment, the driving means may be a variable current, variable frequency ac power supply or a variable voltage, variable frequency ac power supply. The driving means may be arranged to drive the oscillating means at sinusoidally varying amplitudes. The driving means may be arranged to drive the oscillating means at sinusoidally varying amplitudes at the resonance frequency of the apparatus. The driving means may be arranged to drive the oscillating means at varying modulation frequencies. In this way, the frequency of the envelope of the oscillations of the oscillating means may be increased or decreased while still driving the oscillating means at resonance.

The vehicle may comprise a microprocessor programmed and operable to carry out one or more of the steps of the third aspect. The microprocessor may be arranged to send signals to the driving means to vary the frequency of the envelope of the oscillations of the oscillating means according to the speed of the vehicle.

The vehicle may comprise one or more pressure sensors. The or each pressure sensor may be arranged to send signals to the microprocessor indicative of the pressure adjacent the apertures of the or each pressure-drag-reducing apparatus. The or each pressure sensor may be arranged to sense the pressure of the fluid alternately drawn into and ejected from the cavity. The microprocessor may be arranged to receive signals from the or each pressure sensor and to send signals to the driving means to vary the frequency of the envelope of the oscillations of the oscillating means according to the pressure values it receives. The microprocessor may be arranged to receive signals from the or each pressure sensor and to send signals to the driving means to vary the amplitude of the envelope of the oscillations of the oscillating means according to the pressure values it receives.

The or each apparatus may be positioned at the back of the vehicle with respect to the usual direction of travel of the vehicle. The or each apparatus may be arranged substantially around the perimeter of the back of the vehicle with respect to the usual direction of travel of the vehicle. In the case that the apparatuses are installed at the perimeter of the back end of the vehicle, they need not obstruct loading and unloading of a vehicle which is loaded and unloaded at the back, for example a large goods vehicle. The or each apparatus may be arranged so that its aperture lies in a plane substantially perpendicular to the direction in which fluid would usually flow over the vehicle. The or each apparatus may be arranged so that the fluid ejected from its aperture is ejected in a direction substantially parallel to the direction of travel of the vehicle.

The vehicle may be a large goods vehicle. The vehicle may be a van. The vehicle may be a car. The vehicle may be a ship. The vehicle may be an aircraft. The vehicle may be conceivably any vehicle that is subject to pressure drag.

According to a second aspect of the invention, there is provided a vehicle according to the first aspect, wherein the apparatus is additionally arranged selectively to increase pressure drag.

At least one of the housing walls may be arranged to be movable to change the volume of the cavity. The or each movable wall may be arranged to tune the resonance frequency of the cavity. The or each movable wall may be arranged to change the resonance frequency of the cavity to substantially match the resonance frequency of the oscillating means.

According to a third aspect of this invention, there is provided a method of at least one pressure-drag-reducing apparatus for reducing the pressure drag on a vehicle, the apparatus comprising: a housing at least partly defining a cavity and an aperture in the housing, the cavity in fluid communication via the aperture with the environment surrounding the vehicle; and oscillating means for creating an oscillation in pressure across the aperture between the cavity and the environment, the cavity volume, the frequency of oscillation, the aperture size and the amplitude of oscillation arranged to cause fluid to be alternately drawn into, and ejected from, the cavity through the aperture, and the apparatus positioned relative to the remainder of the vehicle such that the ejected fluid entrains fluid from the environment to reduce pressure drag on the vehicle, the method comprising the step of:

(a) in response to determining a change in speed of the vehicle, operating the pressure-drag-reducing apparatus to decrease the pressure drag on the vehicle by increasing or decreasing the effective frequency of oscillation of the oscillating means such that it remains within the range of frequencies which produce a decrease in pressure drag on the vehicle.

Step (a) may comprise increasing or decreasing the effective frequency of oscillation of the oscillating means by amplitude modulating the oscillation of the oscillating means and increasing or decreasing the frequency of the envelope of the oscillations of the oscillating means. Step (a) may comprise driving the oscillating means to oscillate at the resonance frequency of the apparatus and amplitude modulating the oscillation of the oscillating means.

Step (a) may comprise a microprocessor sending signals to a driving means to vary the frequency of the envelope of the oscillations of the oscillating means according to the speed of the vehicle. Step (a) may comprise the microprocessor sending signals to the driving means to increase the frequency of the envelope of the oscillations of the oscillating means when the speed of the vehicle increases. Step (a) may comprise the microprocessor sending signals to the driving means to decrease the frequency of the envelope of the oscillations of the oscillating means when the speed of the vehicle decreases. Step (a) may comprise the microprocessor sending signals to the driving means to vary the frequency of the envelope of the oscillations of the oscillating means to maintain the frequency of the envelope of the oscillations of the oscillating means at a frequency at which the ejected fluid entrains fluid from the environment to reduce pressure drag on the vehicle for varying speeds of the vehicle. Pressure drag on the vehicle can therefore be reduced regardless of the speed of the vehicle and while keeping the oscillating means oscillating at resonance, the frequency at which they are most efficient. Step (a) may comprise the microprocessor sending signals to the driving means to vary the frequency of the envelope of the oscillations of the oscillating means to maintain a high Strouhal number for the fluid. The concept of Strouhal numbers will be explained in more detail in the "Specific Description" section below, but in general, a high fluid Strouhal number on a vehicle comprising at least one pressure-drag-reducing apparatus will correspond to a decrease in pressure drag on the vehicle.

The method may include the step (b) of, in response to an input indicative of a change in speed of the vehicle, operating the pressure-drag-reducing apparatus to decrease the pressure drag on the vehicle by increasing or decreasing the amplitude of the envelope of oscillations of the oscillating means such that it remains within the range of amplitudes of oscillation which produce a decrease in pressure drag on the vehicle. Step (b) may comprise a microprocessor sending signals to the driving means to vary the amplitude of the envelope of the oscillations of the oscillating means according to the speed of the vehicle. Step (b) may comprise the microprocessor sending signals to the driving means to increase the amplitude of the envelope of the oscillations of the oscillating means when the speed of the vehicle increases. Step (b) may comprise the microprocessor sending signals to the driving means to decrease the amplitude of the envelope of the oscillations of the oscillating means when the speed of the vehicle decreases. Step (b) may comprise the microprocessor sending signals to the driving means to vary the amplitude of the envelope of the oscillations of the oscillating means to maintain the amplitude of the envelope of the oscillations of the oscillating means at an amplitude at which the ejected fluid entrains fluid from the environment to reduce pressure drag on the vehicle for varying speeds of the vehicle.

The method may include the step of the microprocessor using a look-up table to determine the signals it should send to the driving means to maintain the frequency of the envelope of the oscillations of the oscillating means at a frequency at which the ejected fluid entrains fluid from the environment to reduce pressure drag. The method may include the step of the microprocessor using a look-up table to determine the signals it should send to the driving means to maintain the amplitude of the envelope of the oscillations of the oscillating means at an amplitude at which the ejected fluid entrains fluid from the environment to reduce pressure drag. The method may include the step of the microprocessor modeling the wake region of the vehicle. The microprocessor may use inputs from one or more pressure sensors associated with the apparatus to model the wake region of the vehicle. The microprocessor may increase or decrease the frequency of the or each driving means according to its model of the wake region of the vehicle. The microprocessor may increase or decrease the amplitude of the modulation envelope of each oscillating means according to its model of the wake region of the vehicle. There may be a step of the microprocessor using the model to determine the signals it should send signals to the driving means to maintain the frequency of the envelope of the oscillations of the oscillating means at a frequency at which the ejected fluid entrains fluid from the environment to reduce pressure drag. There may be a step of the microprocessor using the model to determine the signals it should send signals to the driving means to maintain the amplitude of the envelope of the oscillations of the oscillating means at an amplitude at which the ejected fluid entrains fluid from the environment to reduce pressure drag. In embodiments where there is more than one pressure-drag-reducing apparatus, the microprocessor may increase or decrease the frequency of each driving means individually, according to the microprocessor's model of the wake region. In embodiments where there is more than one pressure-drag-reducing apparatus, the microprocessor may increase or decrease the amplitude of the modulation envelope of each oscillating means individually, according to the microprocessor's model of the wake region.

The oscillating means of different pressure-drag-reducing apparatuses may therefore oscillate at different frequencies and/or amplitudes, to produce different pressures in the environments of their apertures. For example, the frequency and/or amplitude of oscillation of the oscillating means of one or more pressure-drag-reducing apparatuses positioned along the side of a vehicle closest to the ground may be different to the frequency and/or amplitude of oscillation of the oscillating means of pressure-drag-reducing apparatuses further away from the ground. Similarly, the frequency and/or amplitude of oscillation of the oscillating means of one or more pressure-drag-reducing apparatuses at the corners of a vehicle may be different to the frequency and/or amplitude of oscillation of the oscillating means of pressure-drag-reducing apparatuses positioned away from the corners of the vehicle.

The method may comprise the step of driving the oscillating means at an effective frequency that is greater than five times the frequency of the shear layer mode. The method may comprise the step of driving the oscillating means at an effective frequency that is greater than six times the frequency of the shear layer mode. The method may comprise the step of driving the oscillating means at an effective frequency that is between five and seven times the frequency of the shear layer mode. The method may comprise the step of driving the oscillating means at an effective frequency that is greater than or equal to six times the frequency of the shear layer mode. The method may comprise the step of driving the oscillating means at an effective amplitude at which the oscillating means generates a primary vortex of maximum strength. The effective amplitude may be selected according to the relationship $$C_\mu = \frac{u_j^2 A_j}{U^2 \cdot A},$$

wherein where $u_j$ is the jet amplitude measured at the centre of the jet aperture, $A_f$ is the aperture area, U is the vehicle speed, and A is the area of the vehicle base.

According to a fourth aspect of this invention, there is provided a method according to the third aspect, wherein the method is additionally for selectively increasing pressure drag.

The method may comprise the step of the driving means varying the frequency of the envelope of the oscillating mean to maintain the frequency of the envelope at a frequency at which the ejected fluid increases pressure drag on the vehicle. The method may comprise the step of the driving means varying the amplitude of the envelope of the oscillations of the oscillating means to maintain the amplitude at an amplitude at which the ejected fluid increases pressure drag on the vehicle. The step may comprise the microprocessor sending signals to the driving means to vary the frequency of the envelope of the oscillations of the oscillating means to maintain the frequency of the envelope of the oscillations of the oscillating means at a frequency at which the ejected fluid increases pressure drag on the vehicle. The step may comprise the microprocessor sending signals to the driving means to vary the amplitude of the envelope of the oscillations of the oscillating means to maintain the amplitude of the envelope of the oscillations of the oscillating means at an amplitude at which the ejected fluid increases pressure drag on the vehicle. The step may comprise the microprocessor sending any of these signals to the driving means responsive to the receipt of driver inputs. The step may comprise the microprocessor sending any of these signals to the driving means responsive to the receipt of a driver input indicative of a desired reduction in speed of the vehicle. In this way, the pressure-drag-reducing apparatus may increase pressure drag on the vehicle responsive to a driver input indicating a desired deceleration of the vehicle. The pressure-drag-reducing apparatus can therefore act as an air brake.

The method may include the step of the microprocessor using a look-up table to determine the signals it should send to the driving means to maintain the frequency of the envelope of the oscillations of the oscillating means at a frequency at which the ejected fluid increases pressure drag. The method may include the step of the microprocessor using a look-up table to determine the signals it should send to the driving means to maintain the amplitude of the envelope of the oscillations of the oscillating means at an amplitude at which the ejected fluid increases pressure drag. The method may include the step of the microprocessor using a model of the wake region of the vehicle to determine the signals it should send to the driving means to maintain the frequency of the envelope of the oscillations of the oscillating means at a frequency at which the ejected fluid increases pressure drag. The method may include the step of the microprocessor using a model of the wake region of the vehicle to determine the signals it should send to the driving means to maintain the amplitude of the envelope of the oscillations of the oscillating means at an amplitude at which the ejected fluid increases pressure drag.

According to a fifth aspect of the invention, there is provided a vehicle according to the first or second aspects, the vehicle arranged to carry out a method according to the third or fourth aspects.

According to a fifth aspect of the invention, there is provided an apparatus according to the first aspect. In other words, the apparatus may not be fitted to a vehicle. It may be used in other applications.

According to a sixth aspect of the invention, there is provided a body comprising at least one drag-reducing apparatus for reducing the drag on the body, the apparatus comprising:

a housing at least partly defining a cavity and an aperture in the housing, the cavity in fluid communication via the aperture with the environment surrounding the body; and oscillating means for creating an oscillation in pressure across the aperture between the cavity and the environment;

the cavity volume, the frequency of oscillation, the aperture size and the amplitude of oscillation arranged to cause fluid to be alternately drawn into, and ejected from, the cavity through the aperture, and the apparatus positioned relative to the remainder of the body such that the ejected fluid entrains fluid from the environment to reduce drag on the body.

The body may be a fan housing or other structure associated with a fan. The fan may be an industrial fan. The or each apparatus may be positioned at the back of the fan with respect to the direction of fluid flow through the fan when the fan is in operation. The or each apparatus may be positioned at the exhaust exit of the fan. The or each apparatus may be arranged substantially around the perimeter of the back of the fan with respect to the direction of fluid flow through the fan when the fan is in operation. In the case that the apparatuses are installed at the perimeter of the back of the fan, they need not obstruct fluid flow through the fan. The or each apparatus may be arranged so that its aperture lies in a plane substantially perpendicular to the direction of fluid flow through the fan when the fan is in operation. The or each apparatus may be arranged so that the fluid ejected from its aperture is ejected in a direction substantially parallel to the direction of fluid flow through the fan when the fan is in operation.

In embodiments where the body is a fan, the apparatus of the sixth aspect of the invention reduces back pressure on the fan, decreasing resistance to the flow of fluid through the fan and thus potentially improving the efficiency of the fan.

Optional features of the first and second aspects are also optional features of the sixth aspect, with changes of terminology being inferred by the skilled addressee where necessary for these to make sense. For example, the word "vehicle" would be interpreted as "body" when applying optional features of the first and second aspects to the sixth aspect.

Optional features defined hereinabove may be combined; they may be provided in embodiments in isolation from each other.

BRIEF DESCRIPTION OF THE DRAWINGS

Specific embodiments will be described below by way of example only and with reference to the accompanying drawings, in which:

FIG. 8a is a third schematic representation of the vehicle of FIGS. 2 and 6 comprising the resonator, showing the streamlines over the vehicle;

FIG. 8b is a schematic representation of a vehicle with a fairing and the streamlines over that vehicle;

SPECIFIC DESCRIPTION OF CERTAIN EXAMPLE EMBODIMENTS

Figure 2:
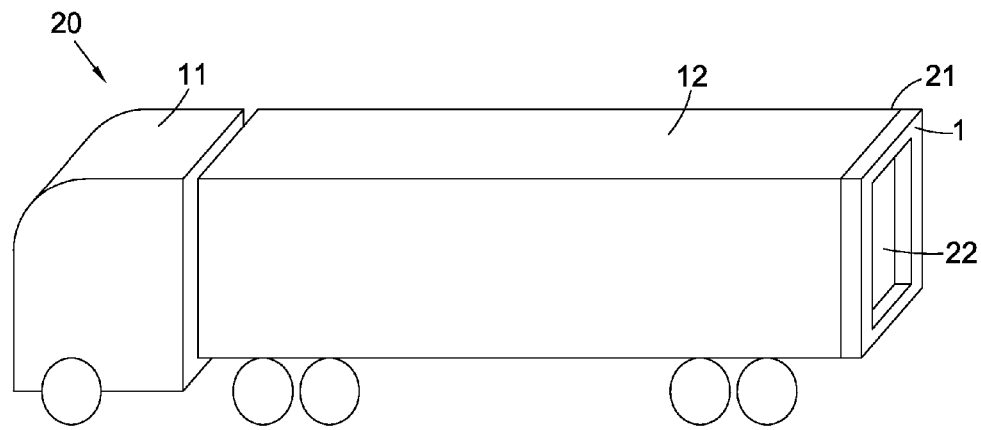
FIG. 2 is a schematic representation of a vehicle comprising a pressure-drag-reducing apparatus in the form of a specially-adapted resonator, the vehicle in accordance with a first embodiment.

FIG. 2 shows a vehicle in the form of an LGV 20. The LGV 20 comprises several pressure-drag-reducing apparatuses 1 for reducing pressure drag on the LGV 20. The pressure-drag-reducing apparatuses are in the form of specially-adapted resonators 1. These will be described in more detail below. In this first embodiment, the resonators 1 are arranged to reduce the pressure drag on the LGV 20. The LGV 20 comprises a cab 11 and a chassis supporting a trailer 12, with several resonators 1 arranged at the back end 21 of the trailer section 12 of the LGV 20. The number of resonators 1 used will depend on their unit cost and weight, but will usually be at least four. More resonators are preferable, but not so many that their cost or weight makes their use prohibitive. The resonators 1 are arranged side-by-side around the perimeter of the back end 21 of the trailer 12. Since the resonators 1 are arranged around the perimeter of the back end 21 of the trailer 12, the doors 22 of the trailer 12 are free to open. The LGV 20 has a power supply which is arranged to power the resonators 1.

Figure 11:
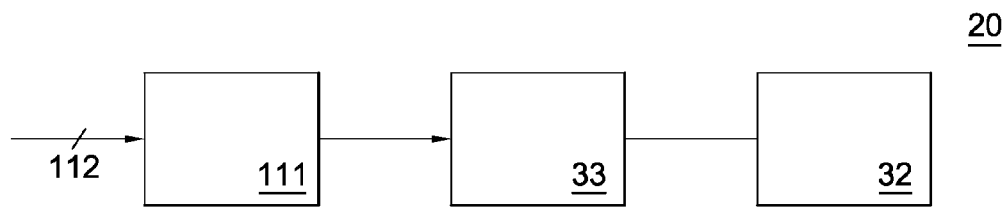
FIG. 11 is a fourth schematic illustration of the vehicle comprising a resonator, showing a microprocessor.

With reference to FIG. 11, the LGV 20 also has a microprocessor 111 that controls the operation of the resonators 1. The operation of the resonators 1 will be described below.

Figure 3:
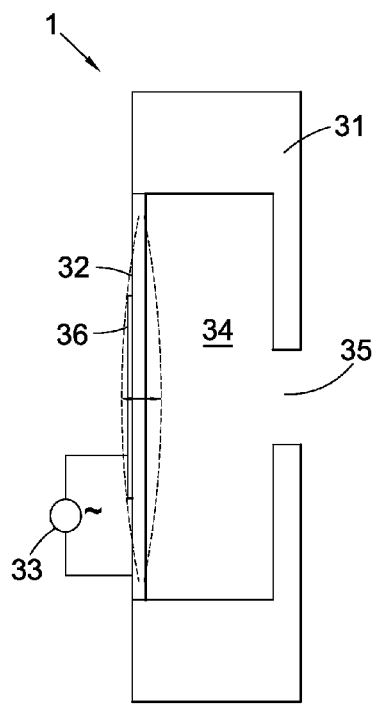
FIG. 3 is a sectional view of a resonator in accordance with the first embodiment, the section being taken through a plane perpendicular to the plane of the oscillating means.

FIG. 3 shows a representation of one of the resonators 1. The resonator 1 comprises a housing 31, oscillating means and a driving means for driving the oscillating means to oscillate. The inner walls of the housing 31 form five sides of a cuboid. The housing 31 therefore defines a cuboidal cavity 34. The sixth side of the cuboid is formed by the oscillating means. The oscillating means is in the form of a diaphragm of sheet steel 32 with a thin layer of a piezoceramic material 36 bonded to one side of it. The steel sheet 32 is pinned along two edges. One of the two longer edges of the sheet 32 is fixed to the inside of one of the longer walls of the housing 31. It is fixed along the opposite edge to the opposite wall of the housing 31. It is fixed such that when it is at rest, the planar surface of the sheet 32 lies substantially perpendicular to the four walls of the housing 31 to which it is adjacent and parallel to the fifth wall of the housing. There is an aperture 35 in a wall of the housing 31 opposite to the side of the cube formed by the diaphragm 32. If the pressure inside the cavity 34 is lower than the pressure of environmental air surrounding the resonator, air from the environment will be sucked into the cavity 34 through this aperture 35. If the pressure inside the cavity 34 is higher than the pressure in the environment, air from the cavity 34 will be ejected into the environment.

Although the diaphragm 32 is pinned along two edges, it is fixed such that it free is to flex and bend to some extent about these sides, the extent of movement being determined by the elasticity of the material which forms the oscillating means 32 (in this case steel). The physics of the vibrational motion of the oscillating means 32 can therefore be modeled as a rectangular membrane fixed along two sides. The resonance frequency of the oscillating means 32 will depend on the material from which it is made, its size and the nature of the means by which it is pinned at its ends. It is therefore more difficult to tune the resonance frequency of the oscillating means 32 than it is to tune the resonance frequency of the cavity 34, however it is still possible to do so by changing these parameters. It will be understood by the skilled person that the oscillating means 32 may form any wall of the cavity 34 and need not form the entire wall, but may be set into it. It will also be understood that the housing 31 need not define a cuboidal cavity 34, but may define, for example, a cubic cavity, or indeed any shape of cavity.

As mentioned above, there is also a driving means for driving the diaphragm 32 to oscillate. The driving means takes the form of a variable frequency, variable voltage ac power supply 33. The ac power supply 33 shown is arranged to apply an alternating voltage to the piezoceramic layer 36 bonded to the steel diaphragm 32 and to thereby cause the diaphragm 32 to oscillate. The layer of piezoceramic material 36 is arranged to expand or contract when charge is applied to it. This expansion or contraction of the piezoceramic layer 36 causes the diaphragm 32 to which it is bonded to bend in one direction or the other (if the piezoceramic layer 36 expands, it pushes the centre of the diaphragm 32 away from the fixed ends in one direction, and, conversely, if the piezoceramic layer 36 contracts, it pulls the centre of the diaphragm 32 away from the ends in the other direction). Thus if an alternating charge is applied to the layer 36, the diaphragm 32 will oscillate. In this embodiment, the driving means requires a relatively low current to achieve a relatively large displacement of the diaphragm 32.

In this first embodiment, the ac power supply 33 is arranged such that the frequency at which it drives the diaphragm 32 to oscillate is the resonance frequency of both the diaphragm 32 and the cavity 34, i.e. the resonance frequency of the resonator 1. In this embodiment, this resonance frequency is the resonance frequency of the diaphragm 32, which, as was mentioned above, is determined by its material, its area and thickness and by its fixings. The volume of the cavity 34 and the aperture width and length have been chosen such that the resonance frequency of the cavity 34 (which can be calculated as described below with reference to FIG. 4) is the same as the resonance frequency of the diaphragm 32. Since the ac power supply 33 is arranged to drive the diaphragm 32 at the resonance frequency of the diaphragm 32, the amplitude of the oscillations of the diaphragm 32 will be the maximum possible for a given voltage subject to the damping forces on the system. Driving the diaphragm 32 at its resonance frequency therefore produces the maximum possible volume displacement for a given input voltage.

The variable voltage, variable frequency ac power supply 33 is also arranged to drive the oscillating means 32 to oscillate at varying amplitudes. This is done by increasing or decreasing the voltage applied to the piezoceramic layer 36 on the diaphragm 32, causing it to expand or contract to a greater or lesser degree (respectively) and therefore to bend the diaphragm 32 at greater or lesser amplitudes. The diaphragm 32 continues to oscillate at the resonance frequency of the apparatus, which therefore becomes the carrier frequency for a second, modulation, frequency introduced by the amplitude modulation. The variable voltage, variable frequency ac power supply 33 is arranged to increase or decrease the modulation frequency. In this way, the effective frequency of oscillation of the diaphragm 32 can be varied to keep it within a range of frequencies which produce a reduction in pressure drag on the LGV 20 (as will be described below) while the diaphragm 32 continues to oscillate at its most efficient frequency of oscillation, the resonance frequency of the resonator 1.

In an alternative embodiment that is not illustrated, the oscillating means simply comprises a steel diaphragm. The driving means in this alternative arrangement comprises a variable frequency, variable voltage ac power supply and a solenoid, wherein the ac power supply is arranged to pass an alternating current through a coil wrapped around a fixed magnetic core. In operation, the coil moves alternately towards the centre of the diaphragm, making contact with the diaphragm substantially perpendicular to the diaphragm surface, and away from it, thereby alternately deforming the diaphragm and allowing it to spring back into shape. This driving means in the form of an ac power supply and a solenoid requires a relatively low voltage supply for a relatively large displacement of the oscillating means. The ac power supply is also arranged to vary the voltage applied to the coil, thereby varying the strength of its magnetic field and the amplitude of the oscillations of the coil. As mentioned in the preceding paragraph, the diaphragm continues to oscillate at the resonance frequency of the apparatus, which therefore becomes the carrier frequency for a second, modulation, frequency introduced by the amplitude modulation. The ac power supply is arranged to increase or decrease the modulation amplitude and/or frequency.

Figure 4:
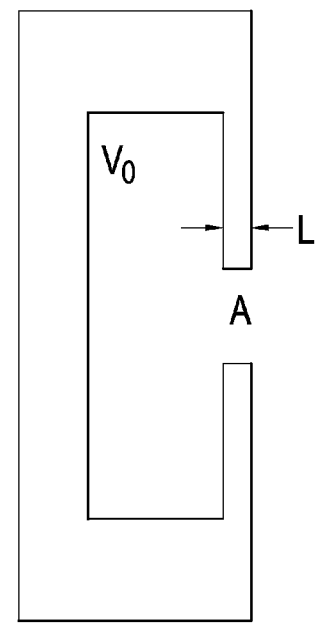
FIG. 4 is a sectional view of a housing defining a cavity with an aperture, included for background purposes.
Figure 5:
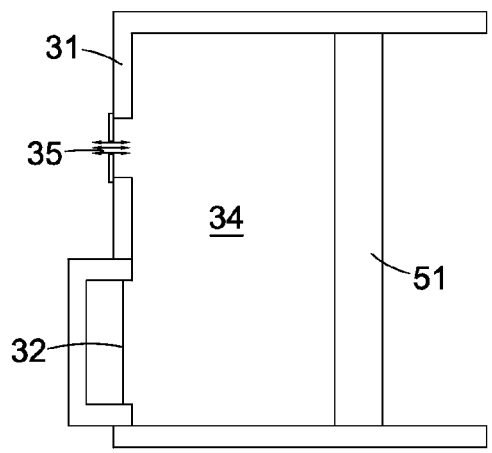
FIG. 5 is a sectional view of a resonator comprising a piston, the piston movable to change the volume of the cavity defined by the housing.

An approach for adjusting the resonance frequency of the cavity 34 to match the resonance frequency of the diaphragm 32 of the resonator 1 in accordance with the first embodiment will now be described with reference to FIGS. 4 and 5. As mentioned above, it is desirable to choose the volume of the cavity 34 and the aperture width and length such that the resonance frequency of the cavity 34 is the same as the resonance frequency of the diaphragm 32 since this produces the maximum possible volume displacement for a given input voltage.

Imagining for a moment that the oscillating means 32 is replaced by a sixth wall of housing 31, such that the apparatus defines a cuboidal cavity 34 with an aperture 35, we can see that the cavity 34 is resonant. This situation is shown in FIG. 4. The resonance frequency, $f_H$, is given approximately by:

$$f_H = \frac{v}{2\pi} \sqrt{\frac{A}{V_0 L}}$$

If the pressure inside the cavity 34 is increased, fluid will flow out through the aperture 35, lowering the pressure inside the cavity 34. This decrease in pressure inside the cavity 34 will leave the pressure inside the cavity 34 lower than the pressure in the environment of the apparatus and fluid will flow into the cavity 34 through the aperture 35. This alternating ejection and suction of fluid will be repeated at approximately the frequency, $f_H$, given by the expression above, with the pressure difference decreasing for each cycle. It can be seen from the above expression that the resonance frequency of the cavity 34 depends on the area, A, of the aperture 35, the length of the aperture 35, L, and the volume of the cavity 34, $V_0$. A larger aperture area A will increase the resonance frequency $f_H$ of this modified apparatus. If the aperture length L is increased, the frequency $f_H$ with which fluid is sucked into and ejected from the cavity 34 will decrease.

For a given aperture area A and length L the resonance frequency $f_H$ of the cavity 34 can be varied by changing the volume $V_0$ of the cavity 34. The skilled person, when designing the resonator 1, may find it convenient to replace the sixth wall of the housing 31 defining the cavity 34 with a piston 31 which is movable to change the volume of the cavity 34 defined by the housing 31. This is shown in FIG. 5. If the piston 51 is moved outwards, increasing the volume of the cavity 34, the resonance frequency of the cavity 34 will decrease. If, on the other hand, the piston 31 is moved inwards, decreasing the volume $V_0$ of the cavity 34, the resonance frequency $f_H$ of the cavity 34 will increase. Thus by moving the piston 31, the resonance frequency $f_H$ of the cavity 34 can be varied. This allows the resonance frequency $f_H$ of the cavity 34 to be matched to the resonance frequency of the diaphragm 32.

Returning to the resonator 1 in accordance with the first embodiment, and with reference now to FIG. 3, the resonator 1 is operated in a manner such that it would reduce drag when appropriately positioned on the LGV 20 in the manner described above with reference to FIG. 2. The variable frequency, variable voltage ac power supply 33 applies an alternating voltage to the piezoceramic material 36 on the diaphragm 32, the voltage alternating at the resonance frequency of both the diaphragm 32 and the cavity 34. The voltage applied to the piezoceramic layer 36 on the diaphragm 32 in one direction, causes the piezoceramic layer 36 to expand and the diaphragm 32 to bend towards the piezoceramic layer 36, while still being pinned at two of its edges. In other words, the diaphragm 32 bows outwards to increase the volume of the cavity 34. This causes the pressure inside the cavity 34 to drop. As a result, fluid from the environment of the resonator is sucked into the cavity 34. The sign of voltage supplied by the ac power supply 33 now changes so that the piezoceramic layer 36 contracts and the diaphragm 32 bends away from the piezoceramic layer 36 and into the cavity 34 defined by the housing 31. This reduces the volume of the cavity 34 and increases the pressure inside the cavity 34. Fluid is therefore ejected from the cavity 34 through the aperture 35 and into the environment. As has already been noted, the diaphragm 32 oscillates at its maximum amplitude for the given applied voltage, so the volume of fluid sucked into and ejected from the cavity 34 is greater than would be the case than if it were oscillating with a smaller amplitude (for example, if it were being driven at a frequency that was not its resonance frequency). Since, as we have noted, the frequency at which the ac power supply 33 drives the diaphragm 32 is also the resonance frequency of the cavity 34, the frequency at which fluid is sucked into and ejected from the cavity 34 through the continuous action of the oscillating diaphragm 32 matches the frequency at which fluid is sucked into and ejected from the cavity 34 due to its natural resonance. The oscillation of the diaphragm 32 and the natural resonance of the cavity 34 therefore combine to displace more fluid into and out of the cavity 34 than would be displaced by the action of one or the other alone.

Figure 6:
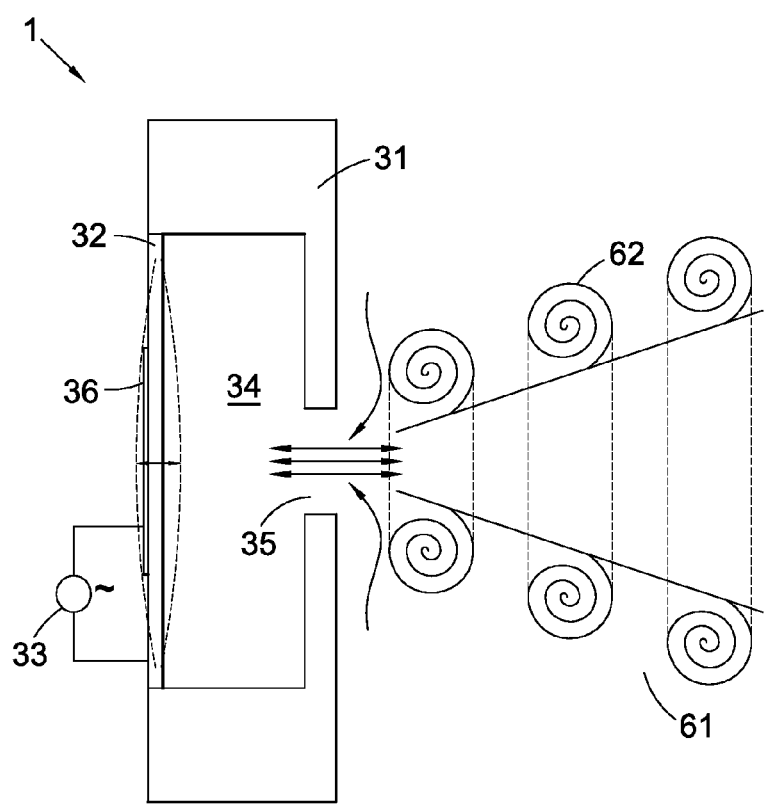
FIG. 6 is a diagram of a synthetic jet produced by the resonator in accordance with the first embodiment.

As the amplitude of the oscillation of the diaphragm 32 is the same for the suction stroke as for the ejection stroke, the volume of fluid which is sucked into the cavity 34 is the same as the volume of fluid which is ejected from the cavity 34. The net mass flux across the aperture 35 of the resonator 1 is therefore zero. The resonator 1 does impart a net momentum, however. Hence the operation of the resonator 1 produces a "synthetic jet" 61, as shown in FIG. 6. The fluid exiting the cavity 34 forms vortices 62 at the lip of the aperture 35. The vortices 62 created in this manner entrain fluid from the environment into the outward flow. When the resonator 1 sucks fluid back into the cavity 34, not all of the vortices 62 created by the ejection of fluid from the cavity 34 are reingested. The vortices 62 which escape come together to create a turbulent jet 61. With the resonators 1 positioned around the periphery of the back end 21 of the LGV 20, the jets 61 they produce form swirling structures that act as a buffer layer, suppressing mixing and acting to streamline the LGV 20 virtually.

The pulsed jet 61 generated by the resonator 1 creates a highly sheared region in which viscous stresses dominate. This region comprises a row of closely spaced vortices. At the high frequencies at which the "virtual streamlining" effect is observed, these vortices constitute a vortex sheet that blocks the component of velocity perpendicular to it, thereby inhibiting the entrainment of fluid from the separating boundary. This process, in which shearing simply aligns the velocity vector with the direction of the jet 61, is therefore responsible for the attenuation of velocities perpendicular to the jet axis. This has the effect of reducing the growth rate of the wake, and consequently must reduce the drag on the body producing the wake.

Figure 1:
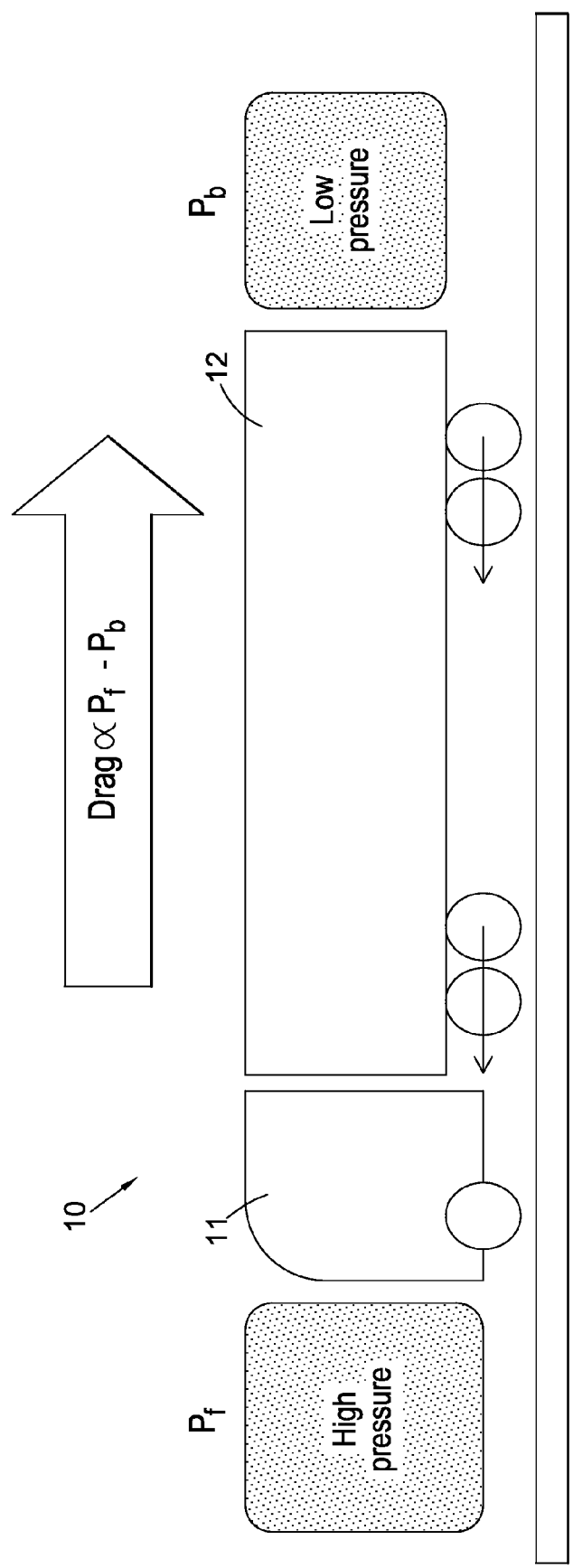
FIG. 1 is a schematic representation of a large goods vehicle (LGV) in motion and the pressure drag thereon.

The resonators 1 on the LGV 20 are operable to reduce pressure drag on the LGV 20. The variable frequency, variable voltage ac power supplies 33 apply an alternating voltage to the piezoceramic layer 36 on each of the diaphragms 32 of the resonators 1, causing the diaphragms 32 to oscillate, in turn causing the production of synthetic jets of air 61. The effect of the synthetic jets 61 around the periphery of the back 21 of the LGV 20 is to increase the pressure at the back of the LGV 20. As discussed in the Background section in relation to FIG. 1, the pressure drag on a vehicle is proportional to the pressure at the front of the vehicle minus the pressure at the back of the vehicle, so increasing the pressure at the back of the vehicle reduces the pressure drag on the vehicle.

The frequency of oscillation of the diaphragms 32 required to reduce pressure drag on the LGV 20 depends on the speed at which the LGV 20 is moving. This can be more easily understood with reference to FIG. 10, which shows the normalised frequency, i.e. the Strouhal number, for different pressures adjacent the aperture 35 of one of the resonators 1. At higher Strouhal numbers or normalised frequencies, the pressure increase is at its greatest (this is in the region numbered 102). The Strouhal number, St, for this LGV 20 with specially-adapted resonators 1 is given by the frequency of oscillation, f, of the diaphragms 32 of the resonators multiplied by a representative length, L, and divided by the speed of the LGV, V. That is:

$$St = \frac{fL}{V}$$

It has therefore been found that to maintain a high Strouhal number St for the LGV 20, and therefore to reduce pressure drag on the LGV 20, the frequency of oscillation f of the diaphragms 32 of the resonators 1 must vary with the speed of the LGV 20, V. Thus, for example, while the LGV 20 is accelerating, the frequency of oscillation f must increase. While the LGV 20 is decelerating, the frequency of oscillation f must decrease.

Since it is desirable to keep the diaphragms 32 oscillating at the resonance frequency of the resonators 1, it is impractical to vary the frequency of oscillation f of the diaphragms 32 according to the speed of the LGV 20 as this would have the undesirable effect of reducing the volume displaced by the resonators 1 for a given input voltage. In order to overcome this problem, amplitude modulation of the carrier resonance frequency is carried out, as will be discussed below. While the LGV 20 is moving, each ac power supply 33 drives the diaphragm 32 of each resonator 1 at the resonance frequency of the resonator 1. A second, modulation, frequency is introduced by the ac power supply 33. The modulation frequency is introduced by the ac power supply 33 varying the voltage applied to the piezoelectric layer on the diaphragm 32 which therefore varies the amplitude of the oscillations of the diaphragm 32. As previously mentioned, the maximum amplitude of oscillations of the air for a given power input can be achieved by operating the resonator 1 at its resonance frequency, so the resonator 1 is therefore at its most efficient at its resonance frequency. The effective frequency of oscillation of the diaphragm 32 can be altered while operating the resonator 1 at its resonance frequency by modulation of the carrier frequency, as just described. Amplitude modulation of the carrier frequency also allows the effective amplitude of oscillation of the diaphragm 32 to be altered.

It has already been mentioned briefly, with reference to FIG. 11, that the LGV 20 comprises a microprocessor 111 arranged to receive speed inputs 112 and, responsive to these inputs, to send signals to the ac power supply 33 to drive the diaphragms 32 of the resonators 1 at varying modulation frequencies as well as at varying modulation amplitudes. Thus, operation of the resonators 1 is under control of the microprocessor 111 executing instructions stored in memory (not shown) to which it has access. It will therefore be understood that the instructions are such as to cause the microprocessor 111 to implement the method of operation described herein. The operation of the LGV 20 will now be described for the case when the resonators 1 are being operated to reduce pressure drag on the LGV 20 and the LGV 20 is accelerating from rest:

The LGV 20 begins at rest. When the power supply of the LGV 20 is switched on, the microprocessor 111 sends signals to the variable frequency, variable voltage ac power supplies 33 to drive the diaphragms 32 of the resonators 1 at the resonance frequency of the resonators. When the LGV 20 begins to accelerate, signal 112, indicative of the speed of the LGV 20, are sent to the microprocessor 111. The microprocessor 111 then sends a signal to each variable frequency, variable voltage ac power supply 33 such that the supplies 33 introduce a modulation frequency of this oscillation by varying the voltage applied to the piezoelectric material on the diaphragms 32. This modulation frequency corresponds to the frequency providing the greatest decrease in pressure drag on the LGV 20 for the velocity Vat which it is moving. As the LGV 20 accelerates, the microprocessor 111 sends signals to the ac power supplies 33 to increase the modulation frequency and amplitude to maintain the modulation frequency and amplitude in the region (102 in FIG. 10) corresponding to the greatest decrease in pressure drag on the LGV 20. When the microprocessor 111 receives speed inputs 112 indicating that the LGV 20 is travelling at a steady speed, the microprocessor 111 no longer adjusts the modulation frequency or amplitude, but maintains the frequency at a frequency producing a high Strouhal number St for the speed at which the LGV 20 is moving and at an amplitude corresponding to the maximum decrease in pressure drag on the LGV 20 for that speed. This will be the mode of operation, for example, for an LGV 20 travelling on a motorway at 60 mph.

The operation of the LGV 20 will now be described for the case when the resonators 1 are being operated to reduce pressure drag on the LGV 20 and the LGV 20 is decelerating from a steady speed. As has just been said, when the LGV 20 is travelling at a constant speed, the microprocessor 111 controls the ac power supplies 33 to maintain the frequency of amplitude modulation of the oscillation of the diaphragms 32 at a frequency producing a high Strouhal number St for the speed at which the LGV 20 is moving. The microprocessor 111 also controls the ac power supplies 33 to maintain the amplitude of the envelope of the modulation of the oscillation of the diaphragms 32 at an amplitude 102 corresponding to a decrease in pressure drag on the LGV 20. When the speed inputs 112 received by the microprocessor 111 are indicative of a decreased speed of the LGV 20, the microprocessor 111 sends signals to the ac power supply 33 to decrease the frequency and amplitude of the amplitude modulation of the oscillating diaphragms 32 proportionally to the decrease in speed of the LGV 20. This maintains the modulation frequency and amplitude in a range producing a decrease in pressure drag on the LGV 20. When the LGV 20 comes to rest, the microprocessor 111 switches off the variable frequency, variable voltage ac power supplies 33, causing the diaphragms 32 to cease oscillating.

Figure 7:
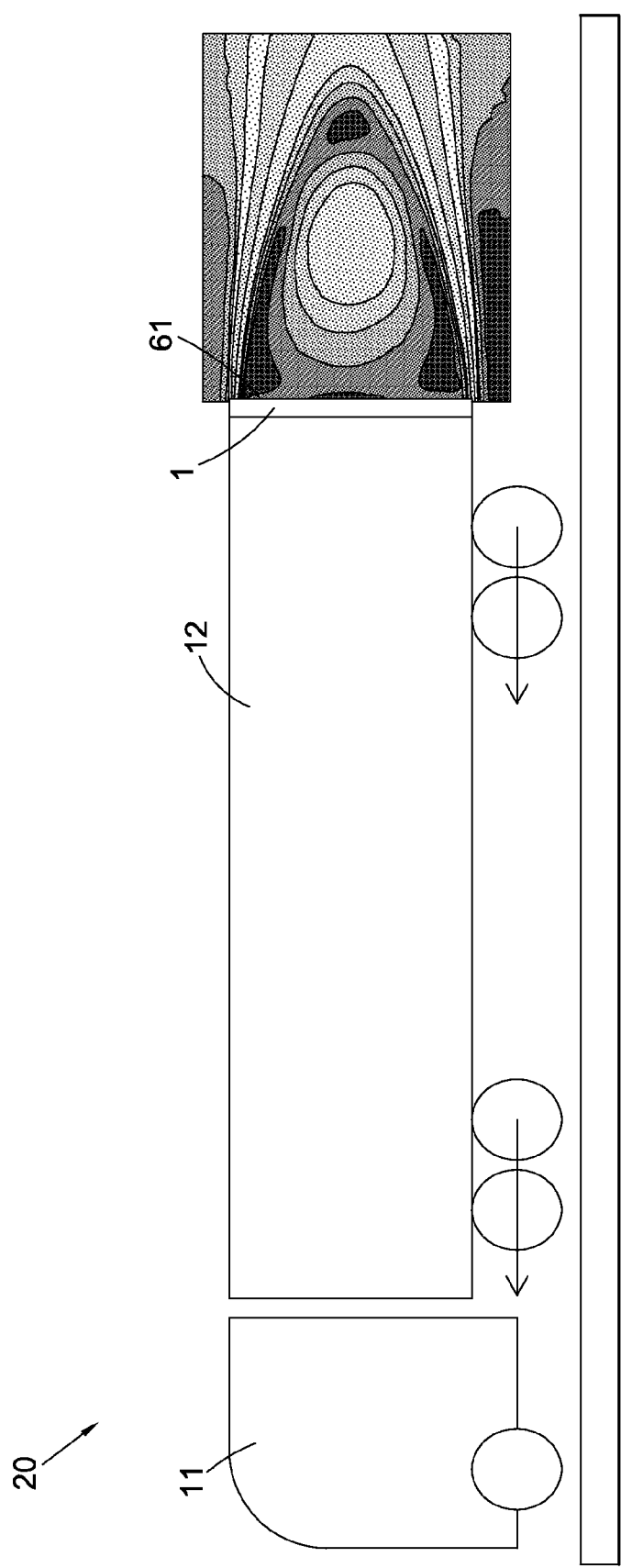
FIG. 7 is a second schematic representation of the vehicle of FIG. 2 comprising the resonator, showing a bending of the wake of the vehicle.

FIG. 7 depicts the LGV 20 moving from right to left. As described, the resonators 1 are arranged around the perimeter of the back end 21 of the trailer section 12 of the LGV 20. In operation, the resonators 1 each produce a synthetic jet 61, creating a 'virtual' afterbody by injecting vortex rings into the wake and effectively streamlining the LGV 20. This bends the wake of the LGV 20, as shown.

FIG. 8*a* again depicts the LGV 20 and shows a representation of the streamlines 81 across the top of the LGV 20 while it is in motion and while the resonators 1 are in operation. FIG. 8*b* depicts the LGV 10 without any pressure-drag-reducing apparatuses and instead with a fairing 82 attached to the back 21 of the trailer 12. This fairing 82 is the size and shape which would be required to provide a decrease in pressure drag on the LGV 10 corresponding to the decrease in pressure drag provided by the resonators 1 affixed to the LGV 20 shown in FIG. 8*a*. As is clear from FIG. 8*b*, the fairing 82 which would be required to provide this pressure drag decrease is large in proportion to the LGV 10. By installing pressure-drag-reducing apparatuses, the pressure drag on the LGV can be decreased without introducing a fairing. Since the resonators 1 are installed at the perimeter of the back end 21 of the LGV 20 trailer 12, they need not obstruct loading and unloading of the trailer 12 to the extent that a fairing fixed around the perimeter of the back 21 of the trailer 12 and curving inwards towards the centre of the trailer would.

Figure 9:
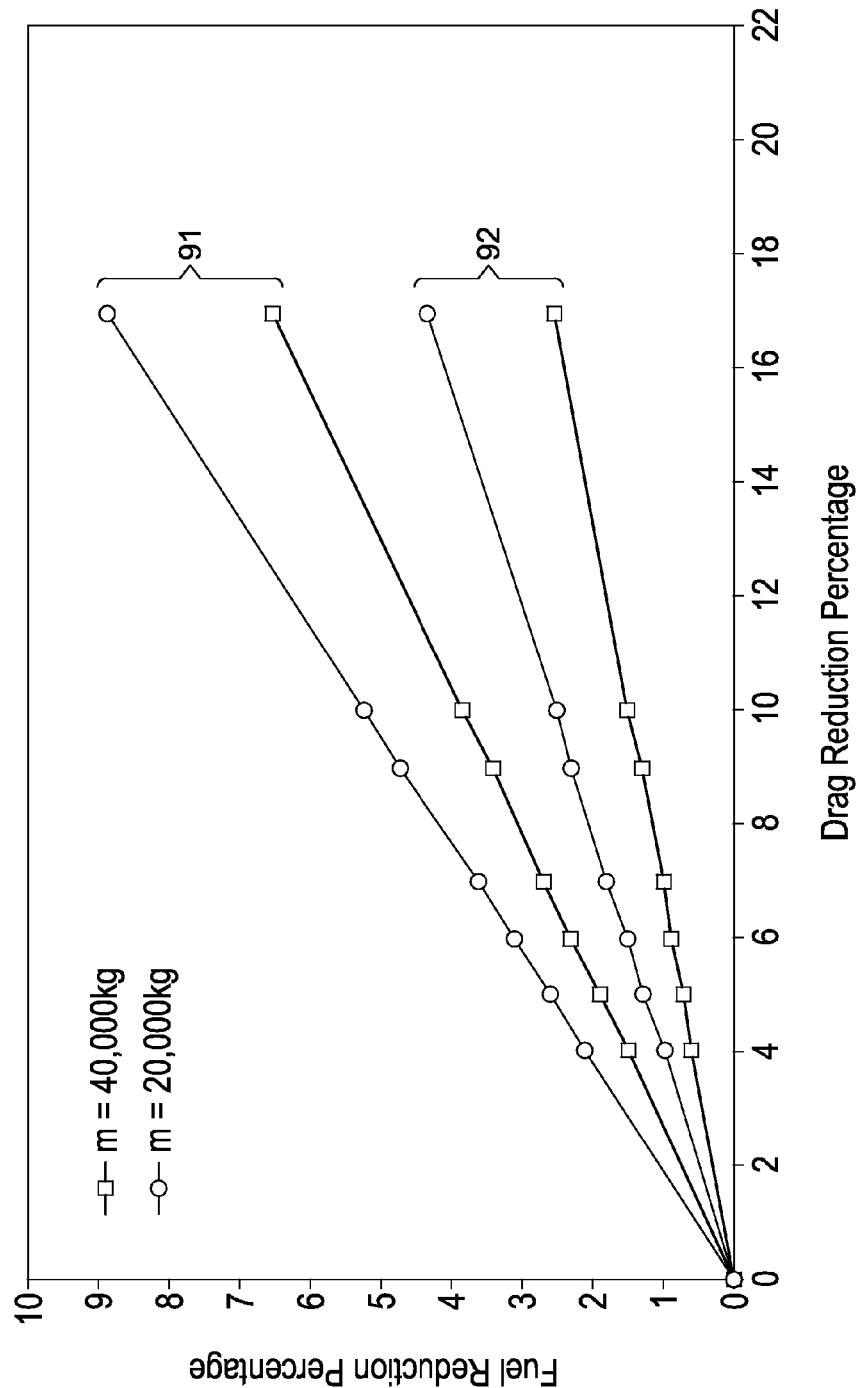
FIG. 9 is an example of a graph showing the correspondence between a reduction in drag on a vehicle and the reduction in fuel use of that vehicle.

Reducing the pressure drag on a vehicle can provide fuel savings. FIG. 9 shows the predicted reduction in vehicle fuel use versus the reduction in drag on that vehicle, for a 20,000 kg vehicle and a 40,000 kg vehicle for both town driving cycles 92 and motorway driving cycles 91.

Figure 12:
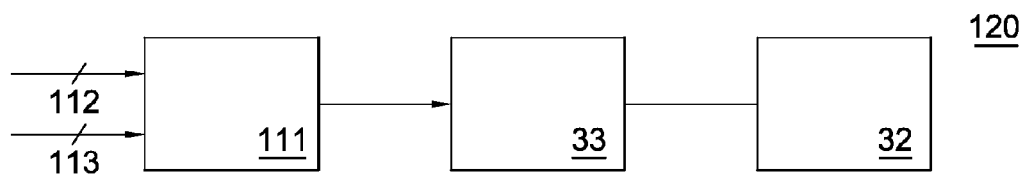
FIG. 12 is a schematic illustration of a vehicle in accordance with a second embodiment, the vehicle comprising a microprocessor.

FIG. 12 shows a schematic of a second LGV 120 comprising resonators 1 for reducing the pressure drag on the LGV 120. In this second embodiment, the resonators 1 can be operated additionally to increase pressure drag on the LGV 120. The mode of operation of the LGV 120 in which the resonators 1 are operated additionally to increase pressure drag on the LGV 120 will now be described with reference to FIGS. 10 and 12. In addition to the inputs 112 indicative of the speed of the LGV 120, the microprocessor 111 of the LGV 120 is arranged to receive driver inputs 113 indicative of a decreased desired speed of the LGV 120. In this embodiment, these driver inputs 113 are generated from the depression of the brake pedal of the LGV 120. In order to produce a decrease in pressure adjacent the apertures 35 of the resonators 1, the envelope frequency at which the variable frequency supply 33 drives the diaphragm 32 is selected to give a low Strouhal number St for the speed at which the LGV 120 is travelling. For a given speed of the LGV 120, this frequency is typically lower than the frequency at which the variable frequency supply 33 drives the diaphragm 32 to produce a synthetic jet 61. The range of normalised frequencies or Strouhal numbers corresponding to a decrease in pressure in the environment of the apertures 35 of the resonators 1, and therefore to an increase in pressure drag on the LGV 20, is the region 101 in FIG. 10. Similarly, the envelope amplitude at which the variable frequency supply 33 drives the diaphragm 32 is also selected to decrease the pressure in the environment of the apertures 35 of the resonators 1. The range of amplitudes corresponding to an increase in pressure drag on the LGV 120 is again in the region 101.

The mode of operation of the LGV 120 in which the resonators 1 are operated additionally to increase pressure drag on the LGV 120 is the same as the operation of the first embodiment LGV 20 for the case when the LGV 20 is accelerating from rest and travelling at a steady speed. The operation of the LGV 120 will therefore be described, with reference to FIGS. 10 and 12, for the case in which the LGV 120 is decelerating from a steady speed:

The microprocessor 111 receives driver inputs 113 indicative of a desired deceleration, in this embodiment an input 113 indicative that the brake pedal has been depressed. The microprocessor 111, responsive to this input 113 and to the speed inputs 112 it receives, sends signals to the ac power supplies 33 causing them to gradually decrease the frequency and amplitude at which they modulate the amplitude of oscillation of the diaphragms 32 to the region 101 of FIG. 10 corresponding to an increase in pressure drag on the LGV 120 for the velocity at which it is travelling. To maintain a low Strouhal number St for the speed of the LGV 120, and therefore to increase pressure drag on the LGV 120, the decrease in the modulation frequency will be ahead of the decrease in velocity, as indicated by the speed inputs 112, of the LGV 120. Similarly, the decrease in the modulation amplitude will also be ahead of the decrease in velocity of the LGV 120. The rate at which the frequency and amplitude of the envelope of the modulation are reduced can be adjusted so that the resonators 1 act as an air brake, without slowing the LGV 120 too quickly and causing it to jolt undesirably. The noise, vibration and harshness (NVH) problems which would be associated with the variable frequency supply 33 switching instantaneously between the frequency and amplitude at which pressure at the back of the LGV 120 is highest and the frequency and amplitude at which it is lowest are therefore minimised.

Figure 13:
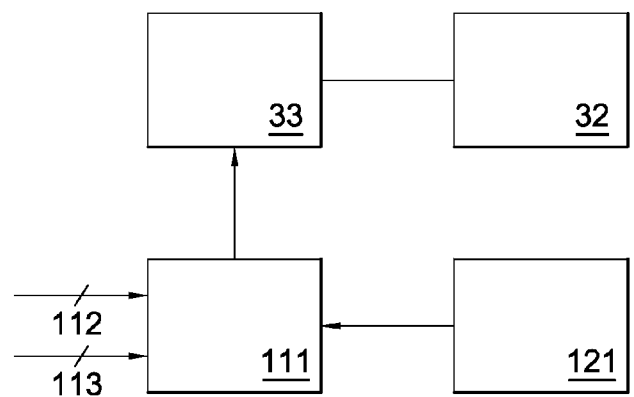
FIG. 13 is a schematic illustration of a vehicle in accordance with a third embodiment, the vehicle additionally comprising an array of pressure sensors.

FIG. 13 shows a schematic of a third LGV 130 comprising resonators 1 for reducing the pressure drag on the LGV 130. In this third embodiment, the driver inputs 113 include inputs indicative of a desired acceleration of the LGV 130. The inputs 113 indicative of a desired acceleration are, in this embodiment, inputs indicating that the accelerator pedal has been depressed. In this embodiment, the LGV 130 comprises an array of pressure sensors (shown in one block) 121 in addition to the resonators 1 and the microprocessor 111. The pressure sensors 121 are arranged to determine the pressure at the back of the LGV 130 and to send pressure values to the microprocessor 111. The microprocessor 111 is arranged to receive the pressure values and to model the wake of the LGV 130. The microprocessor 111 is arranged to send signals to the variable frequency ac power supplies 33 to increase or decrease the frequencies at which the voltage applied to the diaphragms 32 is varied according to the microprocessor's 111 model of the wake and to speed inputs 112 and driver inputs 113. The microprocessor 111 is also arranged to send signals to the variable frequency ac power supplies 33 to increase or decrease the voltage applied to the diaphragms 32 to vary the amplitude of the envelope of their oscillation, again according to the microprocessor's 111 model of the wake and to speed inputs 112 driver inputs 113. Thus, if the microprocessor 111 receives pressure values from the pressure sensors 121 which it determines are indicative of a reduced pressure at the back of the LGV 130, in conjunction with a driver input 113 indicating that the driver wishes to accelerate, the microprocessor 111 will send signals to the ac power supplies 33 so that they drive the diaphragms 32 of the pressure-drag-reducing devices 1 at a frequency and amplitude producing a pressure increase at the back of the LGV 130 for the speed of the LGV 130 indicated by the speed inputs 112. If, on the other hand, the microprocessor 111 receives pressure values which it determines are indicative of an increased pressure at the back of the LGV 130, in conjunction with a driver input 112 indicating that the driver wishes to decelerate, the microprocessor 111 will send signals to the ac power supplies 33 so that the frequency and amplitude of the envelope of the frequency at which they drive the diaphragms 12 of the pressure-drag-reducing devices 1 are such that, for the speed of the LGV 130 indicated by the speed inputs 112, they produce a pressure decrease at the back of the LGV 130.

In an alternative operation of the LGV 130 comprising at least one resonator 1, the microprocessor 111 models the wake of the LGV 130 from the pressure values it receives from the pressure sensors 121 and alters the modulation frequencies and/or amplitudes of the variable frequency, variable voltage ac power supplies 33 individually, according to its model. This operation may be useful, for example, where ground effects are taken into account, so that the frequency or amplitude at which the oscillation of the diaphragms 32 of the resonators 1 along the bottom of the back 21 of the trailer 12 is modulated is different from the frequency or amplitude at which the oscillation of the diaphragms 32 of the resonators around the rest of the perimeter of the back 21 of the trailer 12 is modulated. Similarly, it may be desirable to have the resonators 1 at the corners of the back 21 face of the LGV 130 operate at a different modulation frequency from those along the edges and away from the corners. It has been said before that the Strouhal number St is proportional to the modulation frequency divided by the speed of the LGV 130. For a given position on the LGV 130, it also depends on the length L that best describes the details of the flow mechanisms operating at that position on the LGV 130. Therefore the selected frequencies of modulation for individual resonators 1 will depend on the requirement for either a pressure rise or a pressure decrease in the vicinity of the aperture 35 of the resonator 1 and will be based on the Strouhal number St and particularly on the characteristic length L for that position on the LGV 130. Therefore the selected modulation amplitudes for individual resonators 1 will also depend on the requirement for either a pressure rise or a pressure decrease in the vicinity of the aperture 35 of the resonator 1 and on the characteristic length L for that position on the LGV 130.

In an alternative embodiment of the vehicle comprising at least one resonator 1, the driving means are embodied by variable frequency ac power supplies. The main components of this alternative embodiment are the same as for the first embodiment, with this exception. The variable frequency ac power supplies are operable to increase or decrease the frequency at which the oscillating means 32 of the resonators 1 oscillate. This is in contrast to the variable frequency, variable voltage supplies 33 of the first embodiment, which are operable to drive the oscillating means 32 at resonance and to increase or decrease the frequency and/or amplitude of the envelope of the oscillation. The operation of this alternative embodiment is the same as for the first embodiment, except that there is no amplitude modulation, so it is only the frequency at which the diaphragms 32 oscillate that is varied to produce an increase or decrease in pressure drag.

In a further alternative embodiment, the LGV as just described (in which the driving means 33 are embodied by variable-frequency ac power supplies) additionally comprises an array of pressure sensors 121, as described in relation to the second embodiment. Again, the operation of this alternative embodiment is the same as for the third embodiment, except that there is no amplitude modulation, so it is only the frequency at which the diaphragms 32 oscillate that is varied to produce an increase or decrease in pressure drag.

In a yet further alternative embodiment of the vehicle comprising at least one resonator, the vehicle is a container ship. The specially-adapted resonators 1 are similar to those described above for use with a large goods vehicle, but are arranged at the back end of the tanker below the water line. The synthetic jets 61 which they produce are therefore jets of water. The resonators are operable to bend the wake of the ship. This is possible since the physics of the resonators 1 is essentially the same in water as it is in air.

In another embodiment, an industrial fan comprises a series of resonators, arranged at the exhaust exit of the fan. The resonators are again substantially the same as the resonators 1 described above for use with a large goods vehicle. The apertures of the resonators 1 are arranged so that their apertures lie in a plane substantially perpendicular to the direction of fluid flow through the fan. As described above with reference to FIG. 6 (in the context of an LGV), the jets 61 produced by the resonators 1 act to streamline the fan virtually. This has the effect of reducing the growth rate of the wake, and consequently reducing back pressure on the fan, increasing its efficiency.

As mentioned above, the mechanism by which the described embodiments work is by the pulsed jet 61 generated by the resonator 1 creating a highly sheared region in which viscous stresses dominate. This region comprises a row of closely spaced vortices. At the high frequencies at which the "virtual streamlining" effect is observed, these vortices constitute a vortex sheet that blocks the component of velocity perpendicular to it, thereby inhibiting the entrainment of fluid from the separating boundary. This process, in which shearing simply aligns the velocity vector with the direction of the jet 61, is therefore responsible for the attenuation of velocities perpendicular to the jet axis. This has the effect of reducing the growth rate of the wake, and consequently must reduce the drag on the body producing the wake.

Figure 14A:
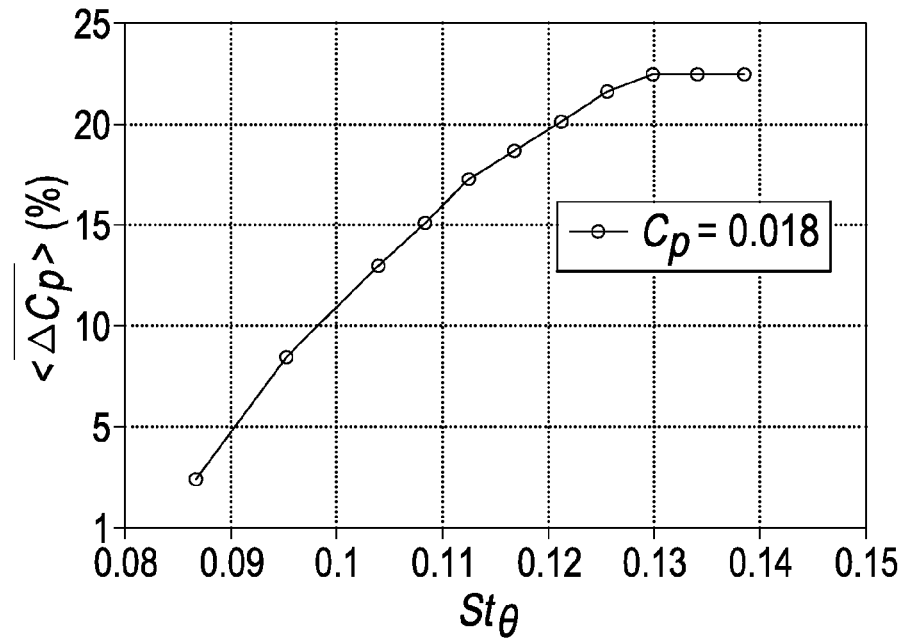
FIG. 14a is an example of a graph showing surface average pressure change as a function of forcing frequency.
Figure 14B:
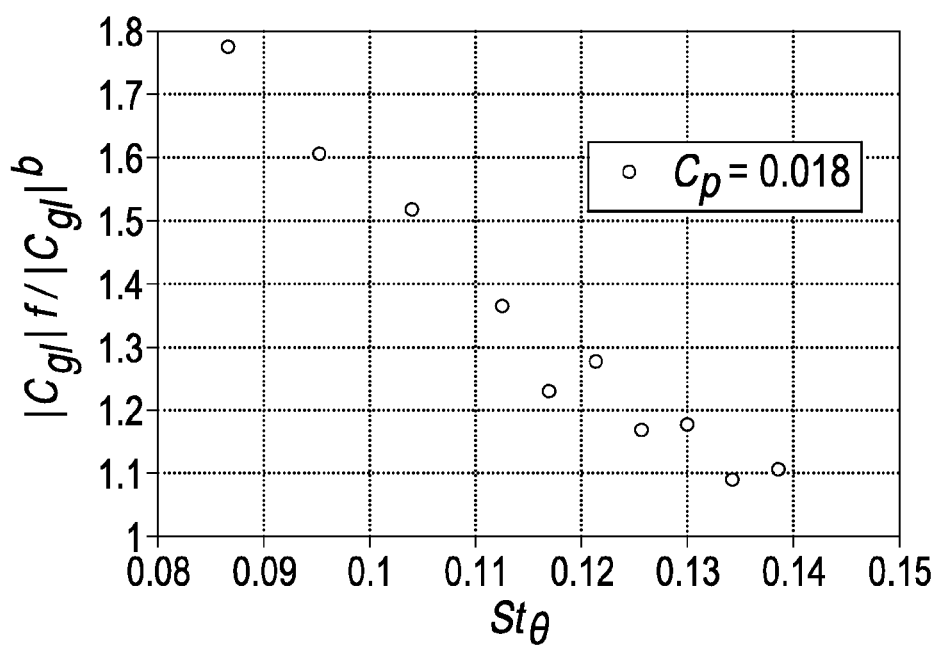
FIG. 14b is an example of a graph showing amplification of the shear layer mode as a function of forcing frequency.

Furthermore, it has been determined that the optimum forcing frequency is about 6 times the frequency of the shear layer mode. Employing this condition avoids unintentional excitation of instabilities in the wake, the most important of which is the shear layer instability. This instability amplifies velocity fluctuations across a broad bandwidth with a peak at a Strouhal number of approximately $St_\theta=0.0022$ (referred to as the shear layer mode). By enhancing fluid entrainment into the wake and increasing the wake growth rate, the shear layer instability competes directly with the 'virtual streamlining' mechanism. Therefore the farther above the shear layer mode the actuation is operated, the more effective actuation becomes. FIG. 14a shows that for a constant forcing amplitude, the base pressure recovery increases with forcing frequency, reaching a plateau at St=0.13. Above this frequency no further improvements in base pressure are obtained because the amplification of the shear layer mode approaches unity. This is shown in FIG. 14b.

Figure 15A:
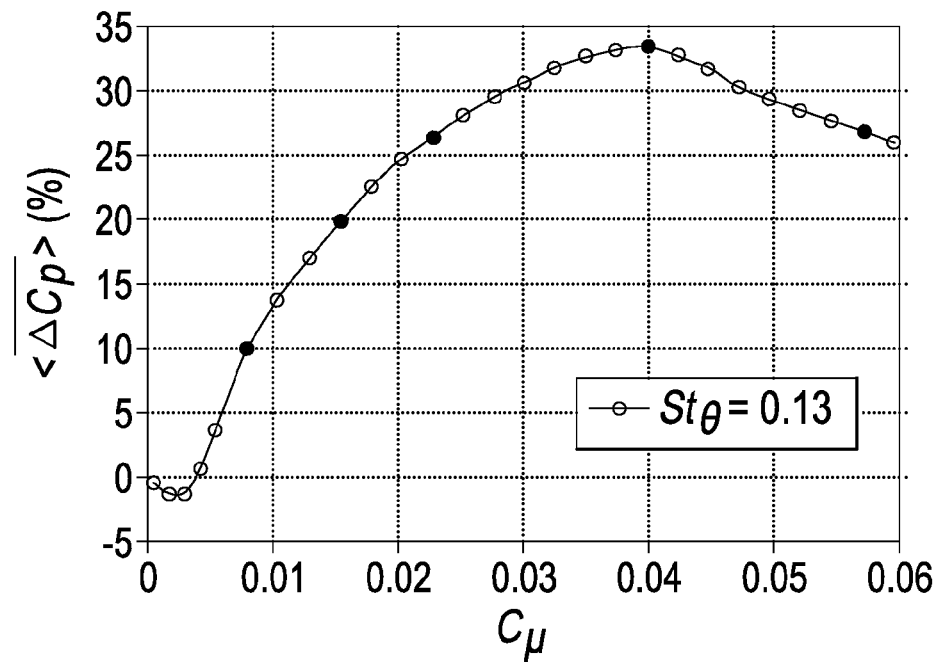
FIG. 15a is an example of a graph showing surface average pressure change as a function of forcing amplitude.
Figure 15B:
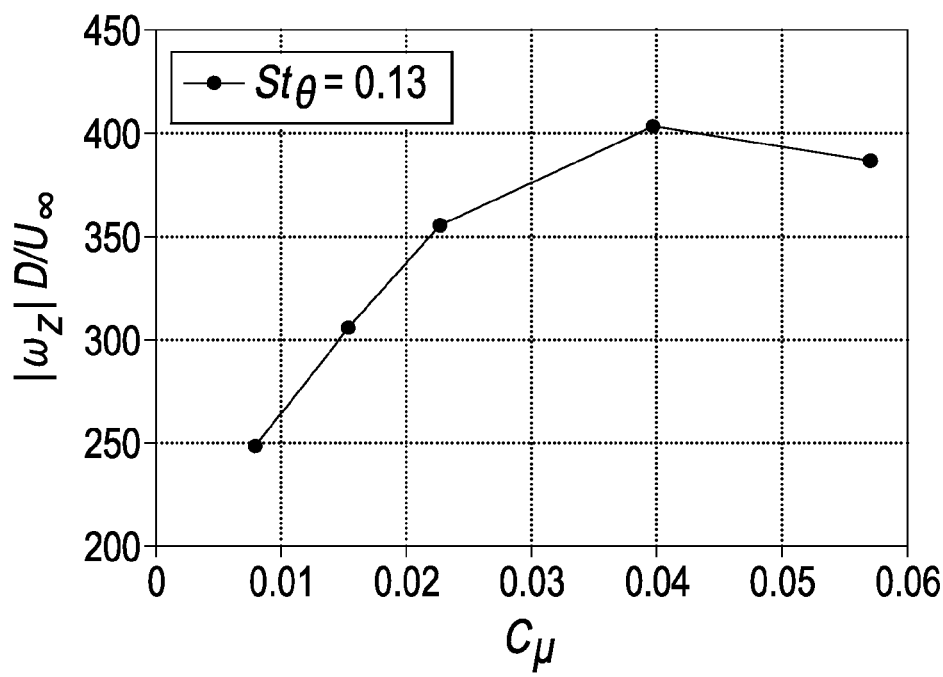
FIG. 15b is an example of a graph showing primary vortex strength as a function of forcing amplitude.

The optimum forcing amplitude is defined as the forcing amplitude at which the actuator generates a primary vortex of maximum strength. For ease of measurement, we characterise the forcing amplitude as a non-dimensional blowing coefficient $$C_\mu = \frac{u_j^2 A_j}{U^2 \cdot A},$$

where $u_j$ is the jet amplitude measured at the centre of the jet aperture, $A_j$ is the aperture area, U is the vehicle speed, and A is the area of the vehicle base. At a constant forcing frequency, the pressure recovery is proportional to the strength of the primary vortex generated by the resonator 1. This is shown in FIG. 15. Initial increases in forcing amplitude strengthen the primary vortex and therefore increase the pressure recovery. At the optimum forcing amplitude ($C_\mu \sim 0.4$ in this case) the strength of the primary vortex saturates; further increases in forcing amplitude yield a reduced pressure recovery as the primary vortex breaks down.

Figure 10:
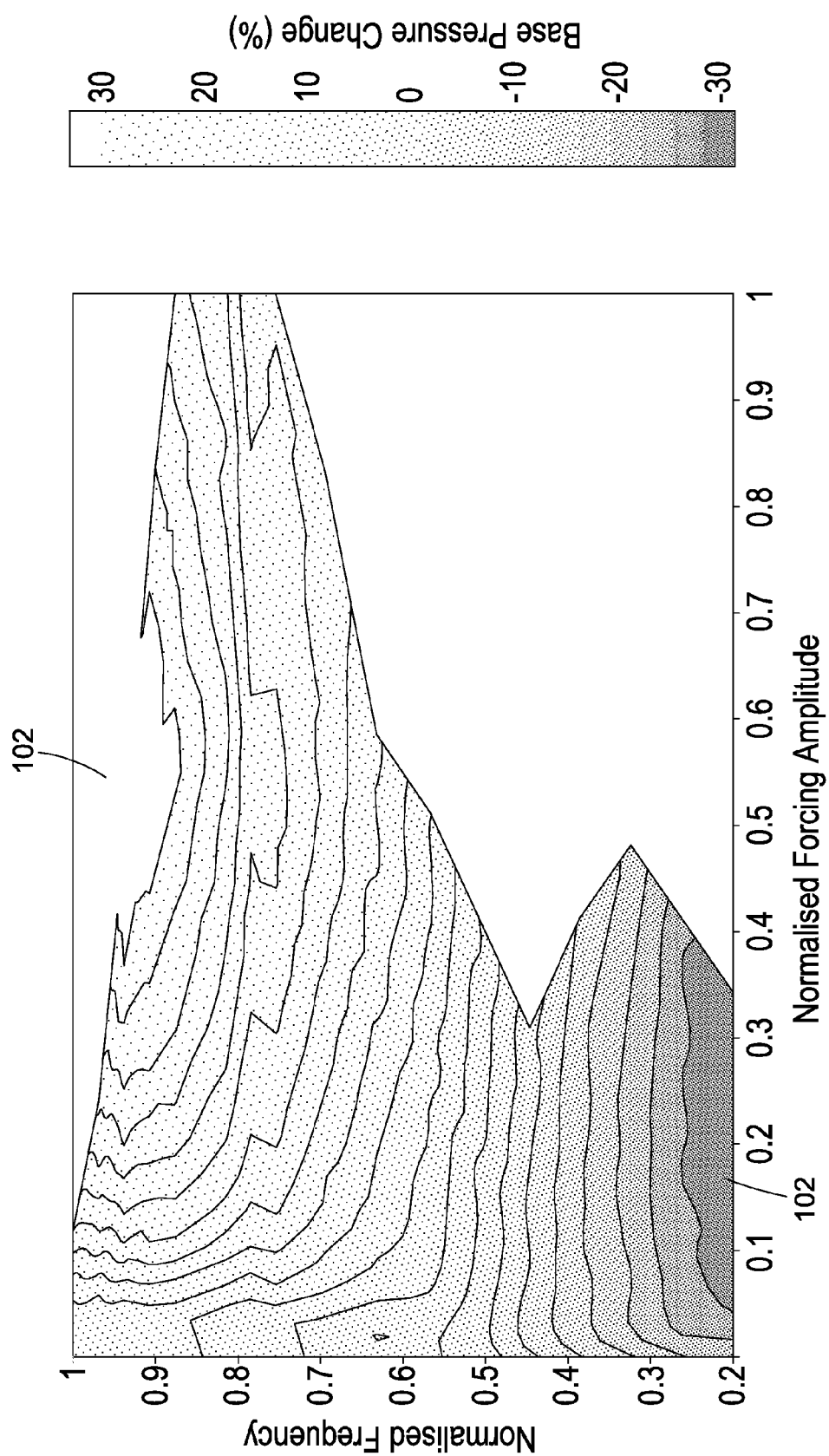
FIG. 10 is an example of a graph showing the variation in pressure corresponding to different frequencies of oscillation of the oscillating means.
Figure 16:
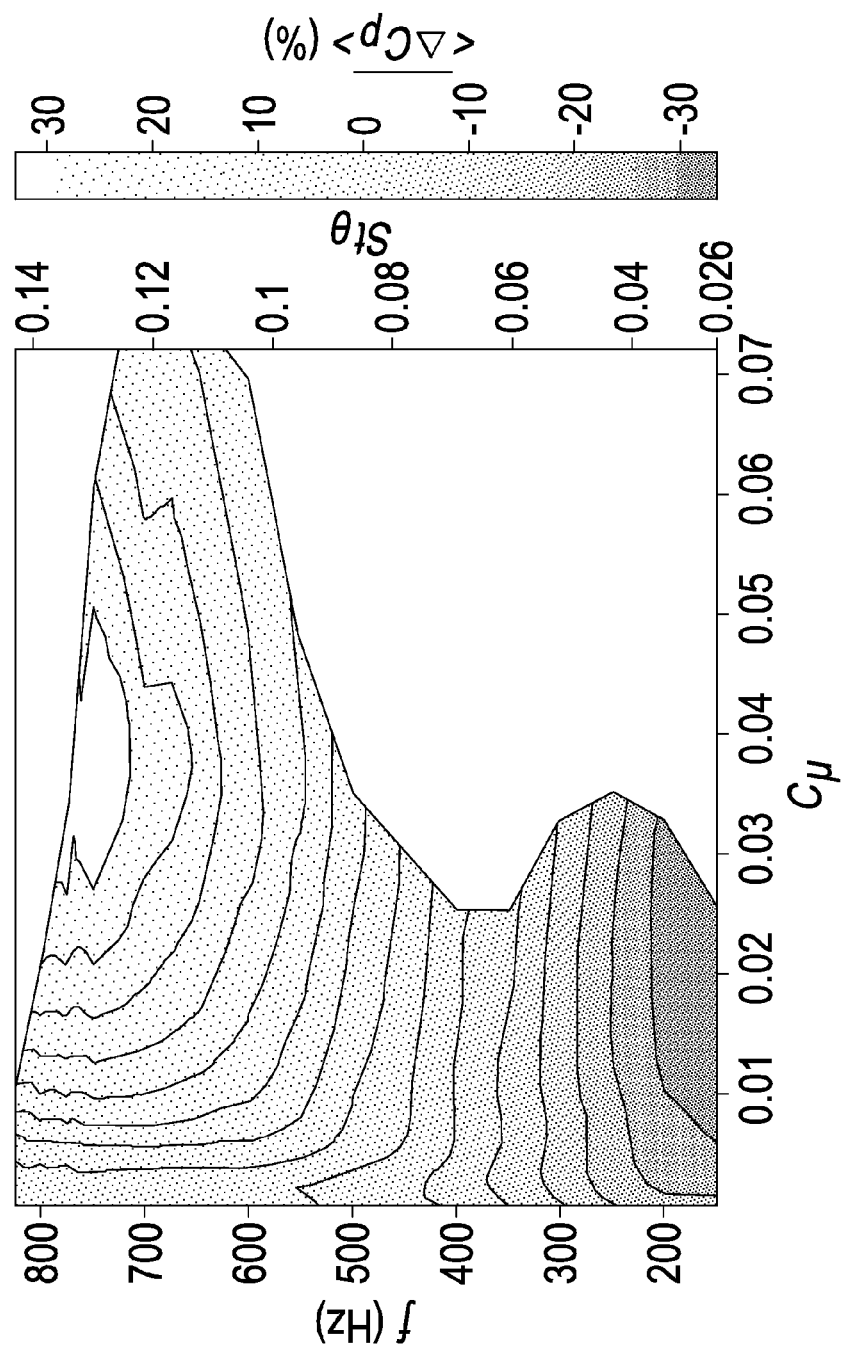
FIG. 16 is an example of a graph showing the showing the non-dimensional blowing coefficient corresponding to different frequencies of oscillation of the oscillating means.

FIG. 16 illustrates the same relationships as FIG. 10, but additionally shows the frequency and amplitude in the non-dimensional form referred to in the previous three paragraphs. It will be understood that FIG. 16 and those previous three paragraphs provide further explanation and guidance for practicing the embodiments disclosed herein.

The invention claimed is:

1. A vehicle comprising at least one pressure-drag-reducing apparatus for reducing the pressure drag on the vehicle, the apparatus comprising:
    a housing at least partly defining a cavity and an aperture in the housing, the cavity in fluid communication via the aperture with the environment surrounding the vehicle; and
    oscillating means for creating an oscillation in pressure across the aperture between the cavity and the environment;
    the cavity volume, the frequency of oscillation, the aperture size and the amplitude of oscillation arranged to cause fluid to be alternately drawn into, and ejected from, the cavity through the aperture, and the apparatus positioned relative to the remainder of the vehicle such that the ejected fluid entrains fluid from the environment to reduce pressure drag on the vehicle;
    wherein the apparatus is arranged so that the fluid ejected from its aperture is ejected in a direction substantially parallel to the direction of travel of the vehicle to create a highly sheared region in which viscous stresses dominate; and
    wherein the vehicle is a large goods vehicle.

2. A vehicle according to claim 1, comprising a driving means arranged to drive the oscillating means.

3. A vehicle according to claim 2, wherein the oscillating means comprises a piezoelectric material bonded to a diaphragm.

4. A vehicle according to claim 3, wherein the driving means is arranged to drive the oscillating means by applying an alternating voltage to the piezoelectric material.

5. A vehicle according to claim 2, wherein the driving means is arranged to drive the oscillating means using amplitude modulation.

6. A vehicle according to claim 1, wherein the apparatus is positioned at the back of the vehicle with respect to the direction of travel of the vehicle.

7. A vehicle according to claim 1, wherein the apparatus is arranged substantially around the perimeter of the back of the vehicle with respect to the direction of travel of the vehicle.

8. A vehicle according to claim 1, wherein the apparatus is arranged so that its aperture lies in a plane substantially perpendicular to the direction in which fluid would usually flow over the vehicle.

9. A vehicle according to claim 1, wherein the apparatus is additionally arranged selectively to increase pressure drag.

10. A method of operating at least one pressure-drag-reducing apparatus for reducing the pressure drag on a vehicle, the apparatus comprising:
    a housing at least partly defining a cavity and an aperture in the housing, the cavity in fluid communication via the aperture with the environment surrounding the vehicle; and
    oscillating means for creating an oscillation in pressure across the aperture between the cavity and the environment;
    the cavity volume, the frequency of oscillation, the aperture size and the amplitude of oscillation arranged to cause fluid to be alternately drawn into, and ejected from, the cavity through the aperture, and the apparatus positioned relative to the remainder of the vehicle such that the ejected fluid entrains fluid from the environment to reduce pressure drag on the vehicle;
    wherein the apparatus is arranged so that the fluid ejected from its aperture is ejected in a direction substantially parallel to the direction of travel of the vehicle to create a highly sheared region in which viscous stresses dominate; and
    wherein the vehicle is a large goods vehicle;
    the method comprising the step of:
    (a) operating the pressure-drag-reducing apparatus to decrease the pressure drag on the vehicle.

11. A method according to claim 10, wherein the oscillating means is driven at an effective frequency determined in dependence on the speed of the vehicle.

12. A method according to claim 11, wherein in response to determining a change in speed of the vehicle, the effective frequency of oscillation of the oscillating means is increased or decreased such that it remains within the range of frequencies which produce a decrease in pressure drag on the vehicle.

13. A method according to claim 11, wherein the effective frequency of oscillation is the frequency of amplitude modulation of the oscillations of the oscillating means and increasing or decreasing the effective frequency in step (a) comprises respectively increasing or decreasing the frequency of the envelope of the oscillations.

14. A method according to claim 10, wherein step (a) comprises driving the oscillating means to oscillate at the resonance frequency of the apparatus.

15. A method according to claim 13, wherein step (a) comprises increasing the frequency of the envelope of the oscillations of the oscillating means when the speed of the vehicle increases.

16. A method according to claim 13, wherein step (a) comprises decreasing the frequency of the envelope of the oscillations of the oscillating means when the speed of the vehicle decreases.

17. A method according to claim 10, wherein the method comprises the step (b) of driving the oscillating means at an effective amplitude determined in dependence on the speed on the vehicle.

18. A method according to claim 17, wherein in response to determining a change in speed of the vehicle, the effective amplitude of oscillation of the oscillating means is increased or decreased such that it remains within the range of amplitudes which produce a decrease in pressure drag on the vehicle.

19. A method according to claim 10, wherein the method comprises the step of modelling the wake region of the vehicle, including determining the pressure at a position at or adjacent the aperture of the pressure-drag-reducing apparatus; and the step of driving the oscillating means at an effective amplitude and or effective frequency determined in dependence on the model of the wake region of the vehicle.

20. A method according to claim 19, wherein there is more than one pressure-drag-reducing apparatus, and the method comprises increasing or decreasing the effective amplitude and or frequency of the oscillating means individually, in dependence on the model of the wake region.

21. A method according to claim 10, wherein the method is additionally for selectively increasing pressure drag.

22. A method according to claim 21, wherein the method comprises the step of increasing or decreasing the effective frequency and or amplitude of the oscillations of the oscillating means to maintain the effective frequency and or amplitude at a frequency and or amplitude at which the ejected fluid increases pressure drag on the vehicle.

23. A method according to claim 10, wherein the method comprises the step of driving the oscillating means at an effective frequency that is greater than or equal to six times the frequency of the shear layer mode.

24. A method according to claim 10, wherein the method comprises the step of driving the oscillating means at an effective amplitude at which the oscillating means generates a primary vortex of maximum strength.

25. A method according to claim 24, wherein the effective amplitude is selected according to the relationship:

$$C_\mu = \frac{u_j^2 A_j}{U^2 \cdot A}$$

wherein where $u_j$ is the jet amplitude measured at the centre of the jet aperture, $A_j$ is the aperture area, U is the vehicle speed, and A is the area of the vehicle base.

* * * * *